UNITED STATES PATENT OFFICE.

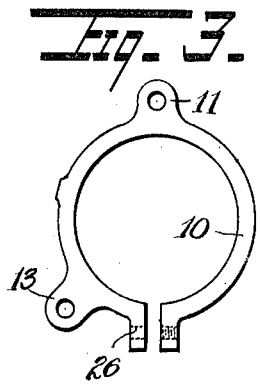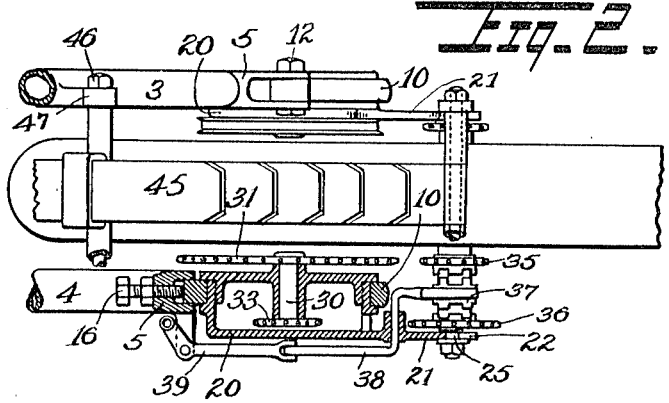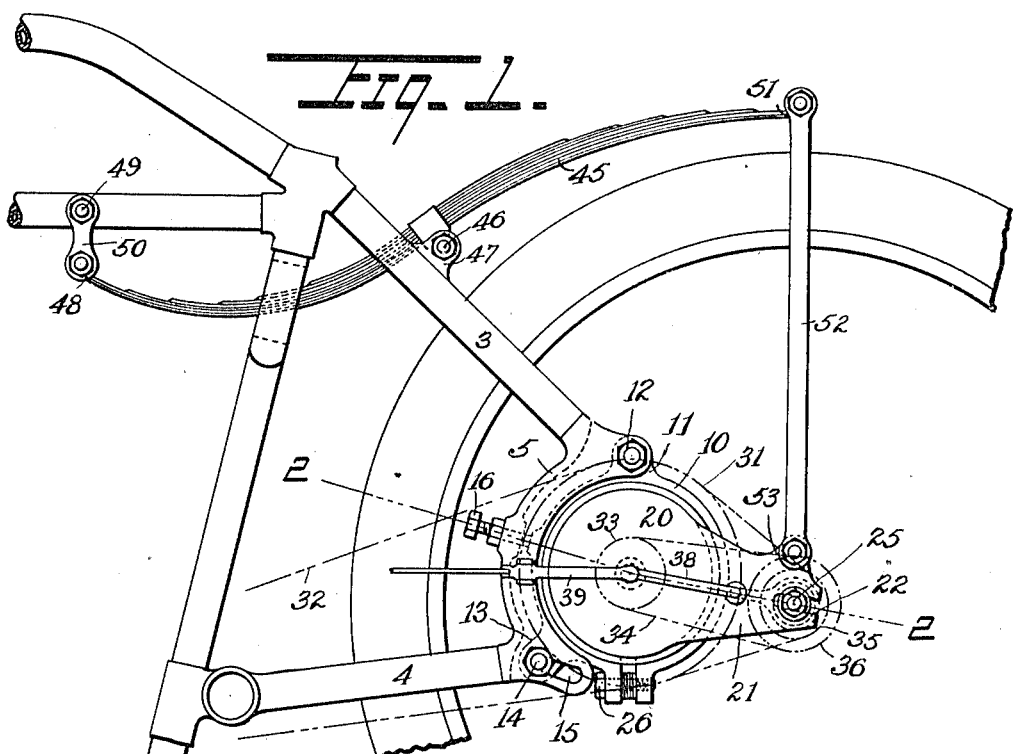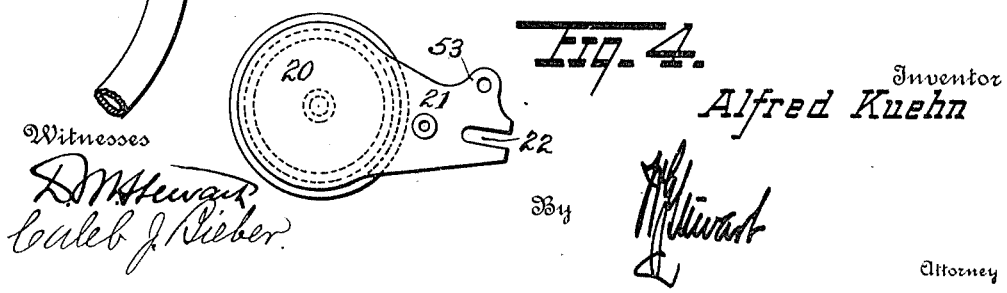

ALFRED KUEHN, OF CHICAGO, ILLINOIS.

TRACTION-WHEEL MOUNTING.

1,063,978.  Specification of Letters Patent.  Patented June 10, 1913.

Application filed July 19, 1912. Serial No. 710,379.

*To all whom it may concern:*

Be it known that I, ALFRED KUEHN, a subject of the Emperor of Germany, and a resident of the city of Chicago, in the county of Cook and State of Illinois, United States of America, have invented certain new and useful Improvements in Traction-Wheel Mountings, of which the following is a specification.

My invention relates particularly to forked-frame bicycles and like vehicles having a spring-carried traction wheel mounting in connection with a rigid frame construction, such as is set forth in my pending application Ser. No. 671,645 filed January 7th, 1912; and it consists in certain improvements in this type of machine which are fully described in connection with the accompanying drawings and specifically pointed out in the subjoined claims.

Figure 1 is a side elevation of the rear portion of the forked frame of a bicycle or tricycle showing my improved connection of the spring-controlled swinging wheel carriers thereto and a clutch-controlled two-speed operating gear for the traction wheel axle. Fig. 2 is mainly a cross-sectional view on the line 2—2 of Fig. 1; the pedal drive side being a full top view. Figs. 3 and 4 are separate views respectively of the adjustably-connected terminal ring and of the swingingly mounted wheel carrier.

Each member of the rear frame fork of the bicycle frame indicated, is made up of angularly arranged bars 3 and 4 the converging ends of which are rigidly joined to a segmental shaped fork terminal 5. This fixed terminal 5 is adapted for the adjustable attachment thereto of a separate terminal ring 10 in which the swinging wheel carrier is pivotally mounted. This separate terminal ring 10, as shown, is provided with a projecting pivot ear 11 which is secured by a bolt 12 to the upper portion of the rigid fork terminal 5, and also with a clamping ear 13 which is adjustably secured to the lower portion of said terminal 5; this adjustable connection being effected in the particular construction indicated by means of a clamping bolt 14 slidably engaged in a slot 15 of the terminal 5, which bolt is tightened to fix the ring after the latter has been swung upon its pivotal connection 11 by a suitable set screw 16 to desired position relative to the terminal 5.

Each wheel carrier comprises a cylindrical portion 20 which is rotatably mounted in the corresponding adjustably fixed terminal ring 10; and an extension 21 having an axle bearing 22 eccentric to the pivotal axis of the portion 20, so that the traction wheel axle 25 which is engaged in said bearing 22 will be swung around said axis at a suitable distance therefrom as in my prior construction referred to. The terminal ring 10 is split and provided with an adjusting bolt 26 to insure proper fit of the rotatable wheel carrier portion 20. The latter is provided with a centrally mounted shaft 30 having fixed thereto, as shown, a relatively large diameter chain wheel 31 for the main drive chain 32 and a smaller chain wheel 33 for a lower-speed drive; the traction wheel axle 25 having loosely mounted thereon coacting chain wheels 35 and 36 respectively, one or other of which may be rendered operative as desired by means of a dog clutch 37 which is adjusted by suitable shifting levers 38, 39.

The tension of the low speed chain 34 may be regulated by adjusting the axle 25 as usual, while the tension of the main drive chain 32 is regulated independently by properly setting the pivotally connected terminal ring 10 as already described.

The swing of the wheel carriers upon their pivotal axis 20, is controlled, as shown, by a longitudinally arranged leaf spring 45; the midway portion of this spring being pivotally connected at 46 to a fixed point 47 of the upper portion of the frame; while the front end 48 thereof is pivotally connected to a point 49 of the frame, by links 50, and the rear end 51 thereof is similarly connected by long links 52 to pivot ears 53 at the free end of the wheel carriers. The swing of the latter, as varying strains are brought upon the traction wheel by road obstructions, is thus controlled so as to reduce the shock to minimum, while the location and action of the spring is most advantageous.

What I claim is:—

1. In a traction wheel mounting for vehicles comprising a frame fork having spring controlled swinging wheel carriers pivotally connected thereto and a traction wheel axle eccentrically mounted in said carriers, a terminal pivot ring for each of said carriers pivotally connected to said frame fork and means for adjustably fixing said ring to the latter.

2. In a traction wheel mounting for vehicles, a frame fork having rigid segmental terminals, adjustable terminal rings having pivotal and adjusting connections to said rigid terminals, and spring controlled swinging wheel carriers pivotally mounted in said rings and provided with a concentric drive-wheel shaft and eccentrically arranged traction-wheel axle supports.

3. In a traction wheel mounting for vehicles having a forked frame, swinging wheel carriers pivotally connected thereto, and a traction wheel axle eccentrically mounted in said carriers, a longitudinally arranged plate spring pivotally connected intermediately and at an end to said frame and having a link connection at the other end to said swinging carriers.

4. In a traction wheel mounting for vehicles having a forked frame, spring controlled swinging wheel carriers pivotally connected to said frame fork, a traction wheel axle eccentrically mounted in said carriers, a drive wheel shaft concentric with said pivotal connection of the wheel carriers, and a clutch controlled operating gear connecting said drive wheel shaft and axle.

In testimony whereof, I affix my signature, in the presence of two witnesses.

ALFRED KUEHN.

Witnesses:
C. E. CURRY,
JAMES P. GERING.

---

Copies of this patent may be obtained for five cents each, by addressing the "Commissioner of Patents, Washington, D. C."